United States Patent
Loud et al.

(10) Patent No.: US 9,738,381 B1
(45) Date of Patent: Aug. 22, 2017

(54) INDUSTRIAL MACHINE ACOUSTIC INSPECTION USING UNMANNED AERIAL VEHICLE

(71) Applicant: General Electric Company, Schenectady, NY (US)

(72) Inventors: Richard Lynn Loud, Ballston Spa, NY (US); Michael Alan Davi, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/051,078

(22) Filed: Feb. 23, 2016

(51) Int. Cl.
| | |
|---|---|
| *B64C 39/02* | (2006.01) |
| *B64B 1/02* | (2006.01) |
| *B64D 47/08* | (2006.01) |
| *G05D 1/00* | (2006.01) |

(Continued)

(52) U.S. Cl.
CPC .............. *B64C 39/024* (2013.01); *B64B 1/02* (2013.01); *B64D 47/08* (2013.01); *G01M 99/005* (2013.01); *G05D 1/0011* (2013.01); *G05D 1/0027* (2013.01); *G05D 1/101* (2013.01); *G05D 1/104* (2013.01)

(58) Field of Classification Search
CPC ......... B64C 39/024; B64B 1/02; B64D 47/08; G01M 99/005; G05D 1/0011; G05D 1/0027; G05D 1/101; G05D 1/104
See application file for complete search history.

(56) References Cited

U.S. PATENT DOCUMENTS

| | | |
|---|---|---|
| 4,818,990 A | 4/1989 | Fernandes |
| 6,947,590 B2 | 9/2005 | Magarey et al. |
| 7,184,863 B2 | 2/2007 | Weineck |

(Continued)

FOREIGN PATENT DOCUMENTS

| | | |
|---|---|---|
| EP | 2527649 B1 | 12/2013 |
| EP | 2702382 A2 | 3/2014 |
| JP | 04475632 | 6/2010 |

OTHER PUBLICATIONS

Corke, P.; Hrabar, S.; Peterson, R.; Rus, D.; Saripalli, S.; Sukhatme, G.; "Autonomous Deployment and Repair of a Sensor Network using an Unmanned Aerial Vehicle."; IEEE Journal; Apr. 2004; 7 pages; Published by International Conference on Robotics and Automation, New Orleans, LA.

(Continued)

*Primary Examiner* — Michael D Lang
(74) *Attorney, Agent, or Firm* — Ernest G. Cusick; Hoffman Warnick LLC (57) ABSTRACT

A method for collecting acoustic data from an industrial machine is disclosed. The method may include: providing an unmanned aerial vehicle (UAV) having an acoustic receiver attached thereto; and positioning the unmanned aerial vehicle at a specific location so that the acoustic receiver collects acoustic data from the industrial machine at the specific location. An acoustic receiver is attached to the UAV for collecting acoustic data from the industrial machine. An acoustic filter is attached to the acoustic receiver and the UAV for filtering unwanted sound from the acoustic data. Acoustic data can be used by a flight control system to identify a specific location relative to the industrial machine that is a source a specific acoustic signature emanating from the industrial machine.

18 Claims, 6 Drawing Sheets

(51) Int. Cl.
*G05D 1/10* (2006.01)
*G01M 99/00* (2011.01)

(56) References Cited

U.S. PATENT DOCUMENTS

| | | |
|---|---|---|
| 7,747,364 B2 | 6/2010 | Roy et al. |
| 8,248,473 B2 | 8/2012 | Graber |
| 2008/0215204 A1 | 9/2008 | Roy et al. |
| 2012/0136630 A1 | 5/2012 | Murphy et al. |
| 2012/0262708 A1 | 10/2012 | Connolly |
| 2012/0300059 A1 | 11/2012 | Stege |
| 2014/0034776 A1* | 2/2014 | Hutson ............... B64D 45/00 244/17.17 |
| 2014/0168420 A1 | 6/2014 | Naderhirn et al. |
| 2016/0144959 A1* | 5/2016 | Meffert ............... B64C 39/024 701/3 |
| 2016/0337771 A1* | 11/2016 | Di Censo ............ H04R 29/00 |

OTHER PUBLICATIONS

Ghosh, Debanjan; Sharman, Raj; Raghav, H.; Shambhu, Upadhyaya; "Self-healing Systems—Survey and Synthesis."; Elsevier Journal; Aug. 17, 2006; 22 pages; Published by Elsevier online.

* cited by examiner

INDUSTRIAL MACHINE ACOUSTIC INSPECTION USING UNMANNED AERIAL VEHICLE

BACKGROUND OF THE INVENTION

The disclosure relates generally to acoustic inspection, and more particularly, to an acoustic data collection system and method using an unmanned aerial vehicle that is advantageous for acoustic inspection of, for example, an industrial machine.

Acoustic inspection of industrial machines is oftentimes required to be performed on a regular basis to ensure compliance with environmental, health and safety (EHS) regulations, and to keep the machines operating reliably and effectively. Illustrative large industrial machines that require inspection may include but are not limited to: any variety of power plant regardless of power source, gas turbines, steam turbines, generators, compressors, wind turbines, manufacturing equipment like industrial presses and printers, etc. In order to inspect such large industrial machines, unmanned aerial vehicles (UAVs) equipped with a variety of non-destructive evaluation devices may be employed. The non-destructive evaluation devices may include, for example, a visual camera, an infrared camera, an acoustic transmitter, an acoustic receiver, a radiation source, a radiation detector, etc.

Use of UAVs to inspect machines has been found advantageous because the size of some machines makes inspection difficult, requiring use of large lifts/cranes and/or construction of scaffolding to provide access for close inspection of the various components. A technician can oftentimes manually climb the relevant parts of the machine, e.g., using climbing equipment, stairs/catwalks, etc., but this is a time consuming, labor intensive and hazardous activity. In addition, there are often limits placed on the number of climbs any one technician can perform per day. This issue can be particularly problematic when an industrial machine has a large number of parts requiring inspection, e.g., a multi-unit combined cycle power plant or a wind turbine farm, or is spread across a large geographic area. In some instances, the industrial machine must be shut down when personnel are in close proximity, which reduces the production capability of the industrial machine currently undergoing an inspection. Inspection of industrial machines in certain geographic locations may also be challenging. For example, inspections of industrial machines may require testing at a position over water, or at a position on land that is impossible or difficult to access using ground-based vehicles.

Acoustic data is one parameter that is regularly inspected with certain industrial machines, typically to ensure compliance with EHS regulations, such as those that limit noise or vibrations. Acoustic data is also collected to identify areas in need of repair. In many settings, acoustic data is acquired by a human operator manually carrying an acoustic receiver to desired locations, or perhaps by installing a very expensive semi-permanent array of microphones at desired locations. While UAVs have been provided with acoustic receivers to collect acoustic data, current UAV acoustic data collection systems collect raw data in a haphazard manner. For example, the UAV may collect acoustic data while flying about performing other inspections or while performing a repair. Consequently, the raw acoustic data collected may not be of much use for acoustic analysis because it contains unnecessary sounds of, for example, a repair tool on the UAV, the UAV propulsion system, etc. Further, if the acoustic data is not collected with any meaningful identification of location relative to the industrial machine, it can make identification of the source of the acoustics impossible.

BRIEF DESCRIPTION OF THE INVENTION

A first aspect of the disclosure provides a method for collecting acoustic data from an industrial machine, comprising: providing an unmanned aerial vehicle (UAV) having an acoustic receiver attached thereto; and positioning the unmanned aerial vehicle at a specific location so that the acoustic receiver collects acoustic data from the industrial machine at the specific location.

A second aspect of the disclosure provides a system for collecting acoustic data from an industrial machine, the system comprising: an unmanned aerial vehicle (UAV); an acoustic receiver attached to the unmanned aerial vehicle for collecting acoustic data from the industrial machine; and an acoustic filter attached to the acoustic receiver and the unmanned aerial vehicle for filtering unwanted sound from the acoustic data, wherein the unmanned aerial vehicle is positioned so that the acoustic receiver collects acoustic data from the industrial machine.

A third aspect includes a system for collecting acoustic data from an industrial machine, the system comprising: an unmanned aerial vehicle (UAV) including a flight control system; and an acoustic receiver attached to the unmanned aerial vehicle for collecting acoustic data from the industrial machine, wherein the flight control system is configured to identify a specific location relative to the industrial machine that is a source a specific acoustic signature emanating from the industrial machine.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides an acoustic data collection system employing an unmanned aerial vehicle (UAV) for acoustic inspection of, for example, large industrial machines.

Figure 1:
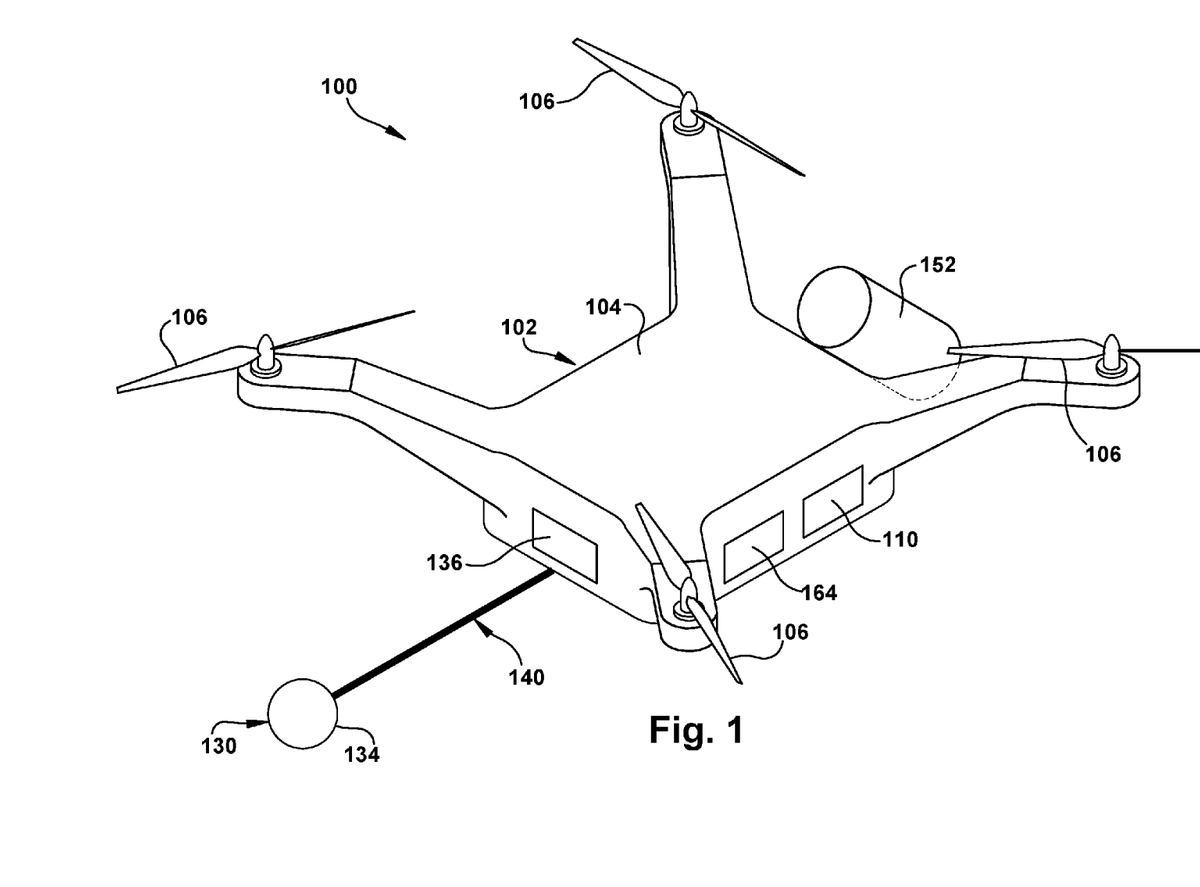
FIG. 1 shows a schematic perspective view of an illustrative unmanned aerial vehicle including an acoustic data collection system according to embodiments of the disclosure.
Figure 2:
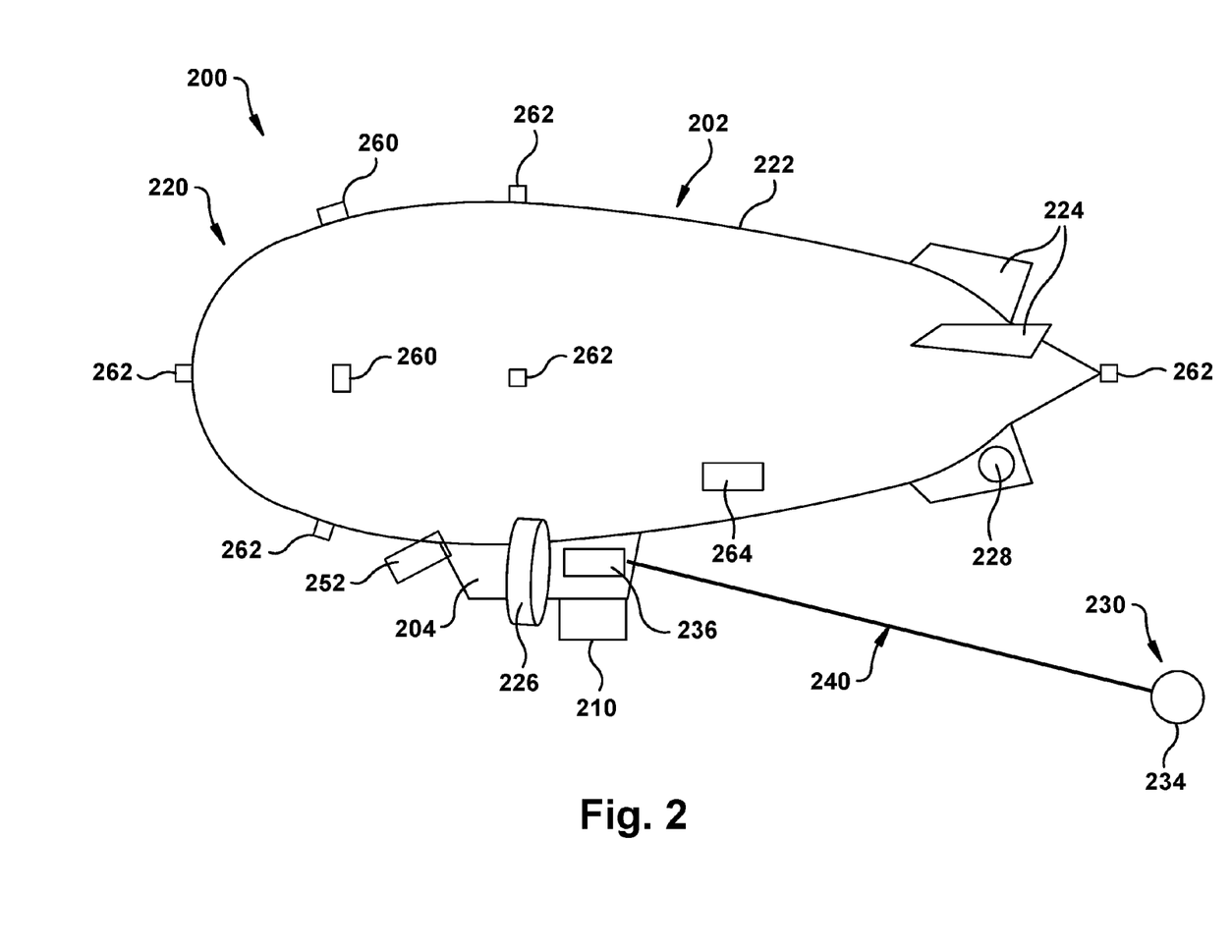
FIG. 2 shows a schematic side elevational view of an illustrative unmanned aerial vehicle including an acoustic data collection system according to another embodiment of the disclosure.

Referring to the drawings, FIGS. 1 and 2 show a schematic perspective view and a schematic side elevational view, respectively, of illustrative acoustic data collection systems 100, 200 for collecting acoustic data from, for example, an industrial machine. Each system 100, 200 includes an unmanned aerial vehicle (UAV) 102, 202, respectively. UAVs 102, 202 can include any now known or later developed form of UAV, which may be referred to by a number of alternative terms such as but not limited to: remotely controlled aerial platform, drone, flying robots, and unmanned navigating aerial vehicle. In the examples shown, the UAVs employed with systems 100, 200 can take the form of a multi-rotor vehicle such as a helicopter (not shown) or quad-copter (FIG. 1) or a non-rigid airship (i.e., blimp)(FIG. 2), or any other device capable of flight with sufficient maneuverability. As shown in FIG. 1, a quadcopter may have a control housing 104 and one or more main rotors 106 (four shown), and may also include one or more tail rotors (not shown). Main rotors 106 are typically oriented in one or more substantially horizontal planes, and any tail rotor (if used) is typically oriented in a substantially vertical plane. It is noted, and as illustrated, multiple rotor vehicles may or may not have a tail rotor, as main rotors 106 in some cases can be used to stabilize or help change the direction of flight and/or spatial orientation.

FIG. 2 illustrates a side elevational view of a UAV 202 taking the form of a non-rigid airship 220 (commonly referred to as a blimp), according to an aspect of the present disclosure. UAV 202 includes a chamber 222 such as a balloon, dirigible, blimp or other lighter-than-air device. A method for generating lift with such devices is accomplished with gases having a lesser density than an ambient atmosphere, by heating ambient air, or by other suitable methods. Coupled to chamber 222 are a number of fins 224 which may include control surfaces for steering blimp 220 in pitch or yaw. Also coupled with chamber 222 is a control housing 204 that may include control devices suitable to receive and process the signal received (or generated) for controlling operation of blimp 220. Control housing 204 supports one or more thrust devices 226, which may be gimbaled to provide lift and/or thrust. Chamber 222 provides lift as previously described, thus, thrust devices 226 are configured to provide supplemental lift to assist in holding payload aloft and/or for controlling vertical positioning of blimp 220. In addition, a steering thrust device 228 may be included to provide another control mechanism and to assist in "pointing" the blimp in the desired direction.

Each UAV 102, 202 includes a flight control system 110, 210 for remotely controlling flight of the UAV. Flight control system 110, 210 may take the form of any now known or later developed controller capable of receiving and transmitting control signals for controlling the various propulsion systems on UAV 102, 202. As will be described, flight control system 110, 210 may also include various additional features according to embodiments of the disclosure. The remote control of UAV 102, 202, as understood, can be human operated by manually controlling the UAV remote control, or can be operated autonomously. In the latter case, UAV 102, 202 can be pre-programmed to fly to pre-selected locations about an industrial machine at which data collection is carried out, as will be described further herein. In any event, UAV 102, 202 can be positioned at a specific location so that an acoustic receiver collects acoustic data from the industrial machine at the specific location.

In accordance with embodiments of the disclosure, an acoustic receiver 130, 230, is attached to UAV 102, 202, respectively, for collecting acoustic data from the industrial machine. Acoustic receiver 130, 230 may include any now known or later developed acoustic collecting device such as a microphone 134, 234. Each collection system 100, 200, in contrast to conventional systems, also includes an acoustic filter 136, 236 attached to acoustic receiver 130, 230, for filtering unwanted sound from the acoustic data collected. Prior to use, each acoustic filter 136, 236 may be preset to filter unwanted sound that is expected to be collected, and may be adjusted (manually or automatically) during or after the operation to adjust the filtering. "Unwanted sounds" may include any sound wave having an amplitude and/or frequency that is not desired to be collected or may cause unwanted interference. For example, unwanted sounds may be related to the UAV, such as but not limited to: propulsion or aerial control noises such as rotor wash, wind rush about the UAV, and precipitation interacting with the UAV. Unwanted sounds also may be related to parts of the industrial machine for which acoustic data collection is not desired, e.g., acoustic data from a part that is known to be working correctly that is next to a part that is malfunctioning and for which acoustic data collection is desired. Acoustic filter 136, 236 can be adjusted to filter out any desired unwanted sounds.

Each collection system 100, 200 may also transmit acoustic data (and other data such as flight control signals) collected to a ground station or remote operator (not shown) wirelessly for recording and analysis using any now known or later developed acoustic analysis system. In the drawings, acoustic filter 136, 236 is shown as located within control housing 104, 204. However, filter 136, 236 may also be positioned remotely from UAV 102, 202, e.g., where proximal filtering is not required and wireless communication allows for immediate transmission to another location such as a ground-based computer. In this regard, UAV 102, 202 may be equipped with on-board data storage or direct transmission of data to ground based receiver/storage device or some combination of both of these.

As illustrated in FIGS. 1 and 2, in accordance with embodiments of the disclosure and in contrast to conventional systems, acoustic collection systems 100, 200 may include a boom member 140, 240 coupled to UAV 102, 202 for positioning microphone 134, 234 of acoustic receiver 130, 230 a distance from UAV 102, 202. Boom member 140, 240 may take the form of any element capable of positioning acoustic receiver 130, 230 (e.g., microphone 134, 234) away from the UAV, such as but not limited to a flexible tether or a lightweight rigid member that may or may not have ability to move the receiver position relative to vehicle. Any electrical connection or wiring necessary to operatively couple to acoustic receiver 130, 230 may be provided along or within boom member 140, 240. Boom member 140, 240 may have any length necessary to reduce or eliminate recording of unwanted sounds, which may include any of the aforementioned sounds but, in particular, unwanted sounds related to the UAV such as but not limited to: propulsion or aerial control noises such as rotor wash, wind rush about the UAV, and precipitation interacting with the UAV. The length of boom member 140, 240 may depend on the propulsion and controls used on the UAV, anticipated environmental conditions such as wind and/or precipitation, the lift capacity of the UAV, among other factors.

Collection system 100, 200 may include a number of flight control system 110, 210 features that enable positioning of UAV 102, 202 at one or more specific locations so that acoustic receiver 130, 230 can collect acoustic data from the industrial machine at one or more specific locations. Each "specific location" can be part of a larger three-dimensional position matrix for which acoustic data collection is desired, e.g., proximal to a part of the industrial machine, at a specified distance from a part of the industrial machine, at a location outside the property border of the industrial machine, etc. Further, each specific location can take the form of any variety of physical locating parameters for UAV 102, 202 and/or acoustic receiver 130, 230 such as but not limited to: a predetermined distance from a particular part of the industrial machine, a particular position within a predetermined geographic area about the industrial machine, a particular angle relative to the particular part, a particular 3D coordinate position, a location at which certain acoustic characteristics are collected by acoustic receiver 130, 230 (e.g., emanating from a part of the industrial machine), etc. In addition, each specific location may be part of a larger three-dimensional position matrix including a number of specific locations, e.g., relative to part of an industrial machine.

Figure 3:
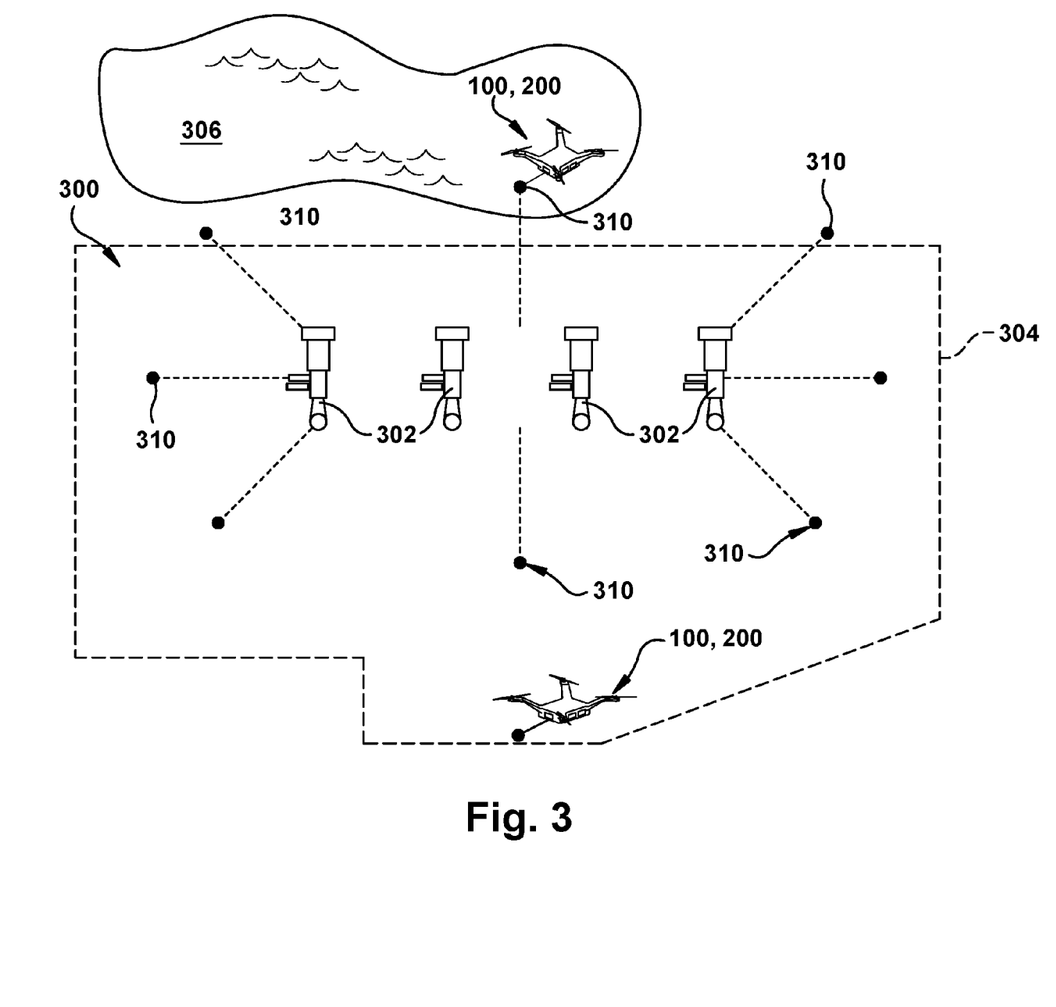
FIG. 3-6 show perspective views of an unmanned aerial vehicle including an acoustic data collection system in use at a variety of industrial machines according to embodiments of the disclosure.
Figure 4:
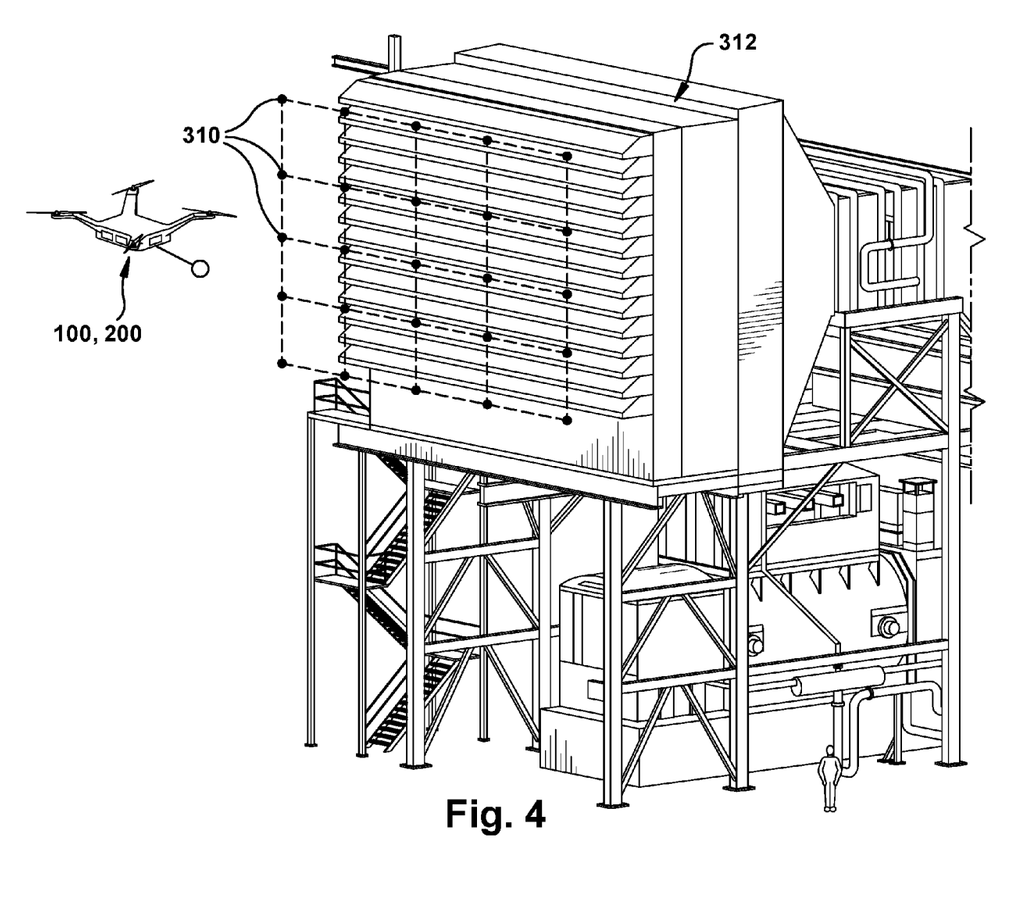
Figure 5:
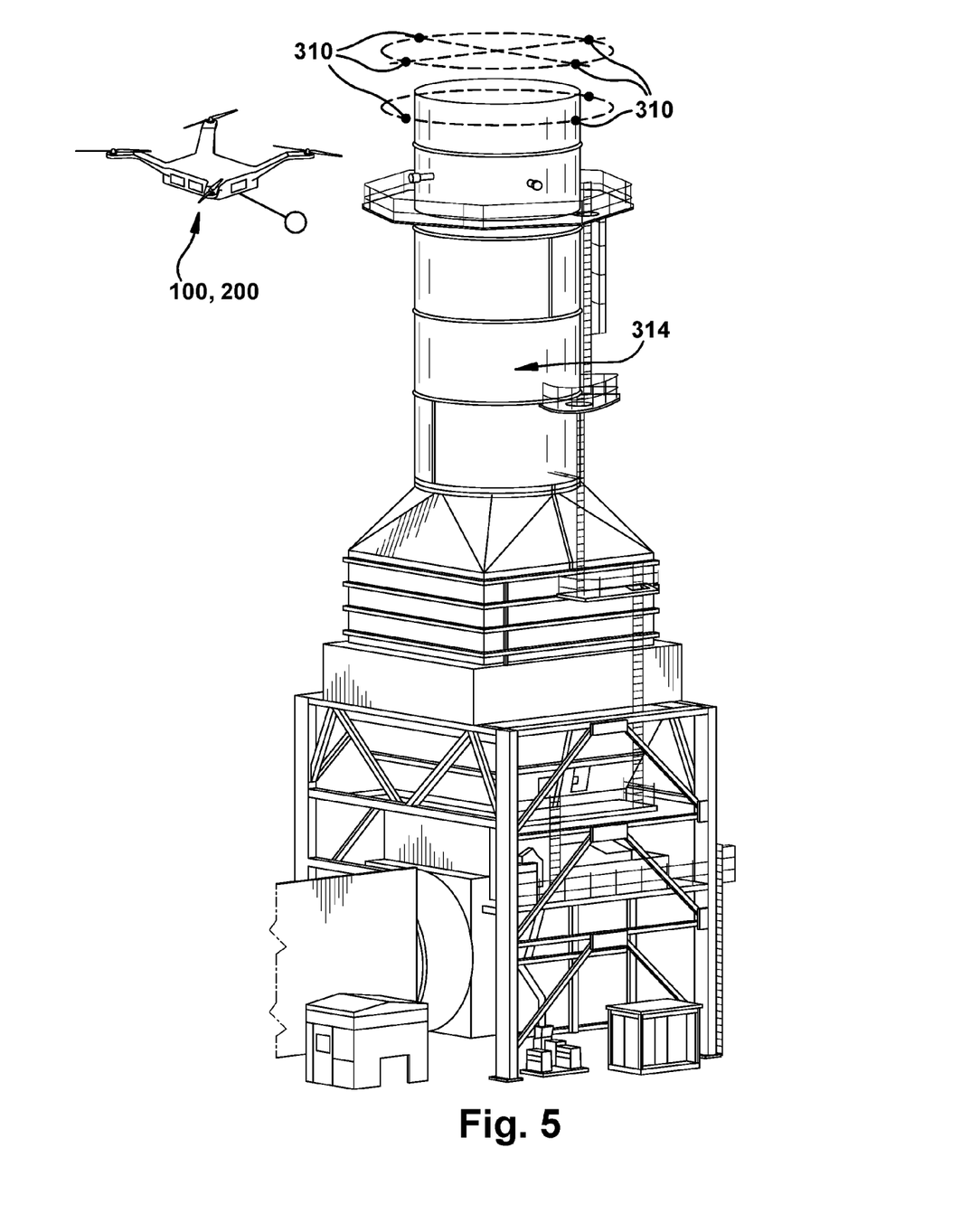

With regard to specific locations that are predetermined, FIGS. 3-5 show various applications in which collection system 100, 200 may be employed to collect acoustic data from, for example, typical power plant equipment. FIG. 3 shows a plan view of a large power plant system 300 including a number of industrial machines 302, e.g., combined cycle power plants with compressor intakes, a gas turbine, one or more steam turbines, and one or more generators, each part of which may create noise. A property border 304 is shown in phantom as is an adjacent body of water 306, e.g., ocean, lake, river, pond, etc. A number of specific locations 310 are shown at which acoustic data collection regarding power plant system 300 is desired. The specific locations may be dictated to be periodically performed by, for example, noise abatement or other environmental regulations, which may be dictated by, among others, the International Organization for Standardization (ISO). FIG. 4 shows a perspective view of an industrial machine in the form of a large compressor intake 312, e.g., for a power plant. A rectangular grid of predetermined specific locations 310 proximal to the intake at which acoustic data collection is desired is shown. FIG. 5 shows perspective view of a large round industrial exhaust stack 314, e.g., of a gas turbine. A pair of circularly arranged predetermined specific locations 310 proximal to an end of the stack at which acoustic data collection is desired are shown. In the FIGS. 3-5 embodiments, each specific location 310 can be dictated by any of the above-described physical locating parameters for UAV 102, 202 and/or acoustic receiver 130, 230. That is, each specific location 310 can be dictated by, for example, a particular 3D coordinate to which collection system 100, 200 can be flown.

In one embodiment, collection system 100, 200 may include a global positioning system 164, 264 (global as well as local GPS)(FIGS. 1 and 2) that operatively interacts with flight control system 110, 210, to determine a relative location of the UAV, e.g., relative to a part of the industrial machine. GPS 164, 264 may be used to at least one of: navigate the UAV and maintain position of the UAV during flight, in conjunction with flight control system 110, 210. In terms of navigation, GPS 164, 264 in conjunction with flight control system 110, 210 may control the UAV manually, e.g., by providing GPS location to a human operator of a remote control for UAV 102, 202. Alternatively, flight control system 110, 210, with or without GPS 164, 264, may be used for locating the UAV 102, 202 about an exterior of the industrial machine based substantially on a pre-programmed autonomous path, i.e., following a predefined flight trajectory while performing acoustic data collection (and perhaps other tasks) at one or more specific location(s) 310 (FIGS. 3-5) defined in the pre-programmed autonomous path. In FIGS. 3-5, a plurality of predetermined specific locations 310 relative to the industrial machine are used. Consequently, collection system 100, 200 would collect acoustic data at each specific location 310 (FIG. 3, 4 or 5) as it flew along a predetermined path including each specific location 310.

In accordance with embodiments of the disclosure, collection system 100, 200 may also be provided with one or more cameras 152, 252 (FIGS. 1 and 2) (e.g., visual, monocular, stereo, infrared and/or other). In one embodiment, a human operator may manually use flight control system 110, 210 (e.g., using ground based remote controls) to identify the specific location based on an image captured by the camera camera(s) 152, 252. In one embodiment, the location identification can be manual, e.g., by showing location on a display of a remote control for manual identification by the human operator. In another embodiment, flight control system 110, 210 may employ camera(s) 152, 252 to automatically identify the specific location 310 based on an image captured by the camera, i.e., to confirm the predetermined physical locating parameters for specific location 310 such as distance from the machine and desired X, Y, Z position by comparison with equipment map, model or other similar reference. In this case, flight control system 110, 210 may employ simultaneous location and mapping (SLAM) technology for close-in navigation/positioning of UAV(s) 102, 202 near selected locations 310, e.g., on power plant equipment such as inlet filter house (FIG. 4), exhaust stack (FIG. 5), etc. Two common SLAM technologies employ: cameras (either monocular, or stereo cameras) to identify a specific location or light detection and ranging (LIDAR) technology may also be used for close range 3D positioning near industrial machines. In LIDAR, typically a target would be illuminated by laser and distance would be measured by analyzing and timing reflected light. This technique could also be used to create a 3D model/map of the industrial machine (or part thereof) which again could be utilized to position UAV 102, 202 properly for performing acoustic data collection. In either case, flight control system 110, 210 creates a three dimensional (3D) (cloud) model of an immediate environment in the vicinity of UAV(s) 102, 202. Information from the 3D model may be combined with other information on the industrial machine, e.g., models, maps, locating marks such as QR or bar codes, etc., to position UAV(s) 102, 202 relatively close to specific location 310 for acoustic data collection.

In replacement of or in addition to SLAM technology, flight control system 110, 210 may also employ other forms of positioning technology. For example, radio frequency based (RFB) positioning location uses portable beacons (each with a unique signature) broadcasting (transmitting) signals that can be received by the UAV(s) 102, 202 for precise relative positioning of UAV(s) 102, 202 based on location of these beacons. The beacons can be, for example, positioned on the industrial machine at or near the specific locations 310 (FIGS. 3-5). Multiple beacons could also be used in a specific pattern on or around the industrial machine (or parts thereof) of interest to provide adequate coverage for required navigation fidelity. The more beacons that are used, the better the positioning fidelity. Other forms of position control and distance control 262 (shown in FIG. 2 only for clarity) may also be employed such as but not limited to: contact type collision detectors, electromagnetic transceivers, acoustic transceivers, and radar transceivers.

Figure 6:
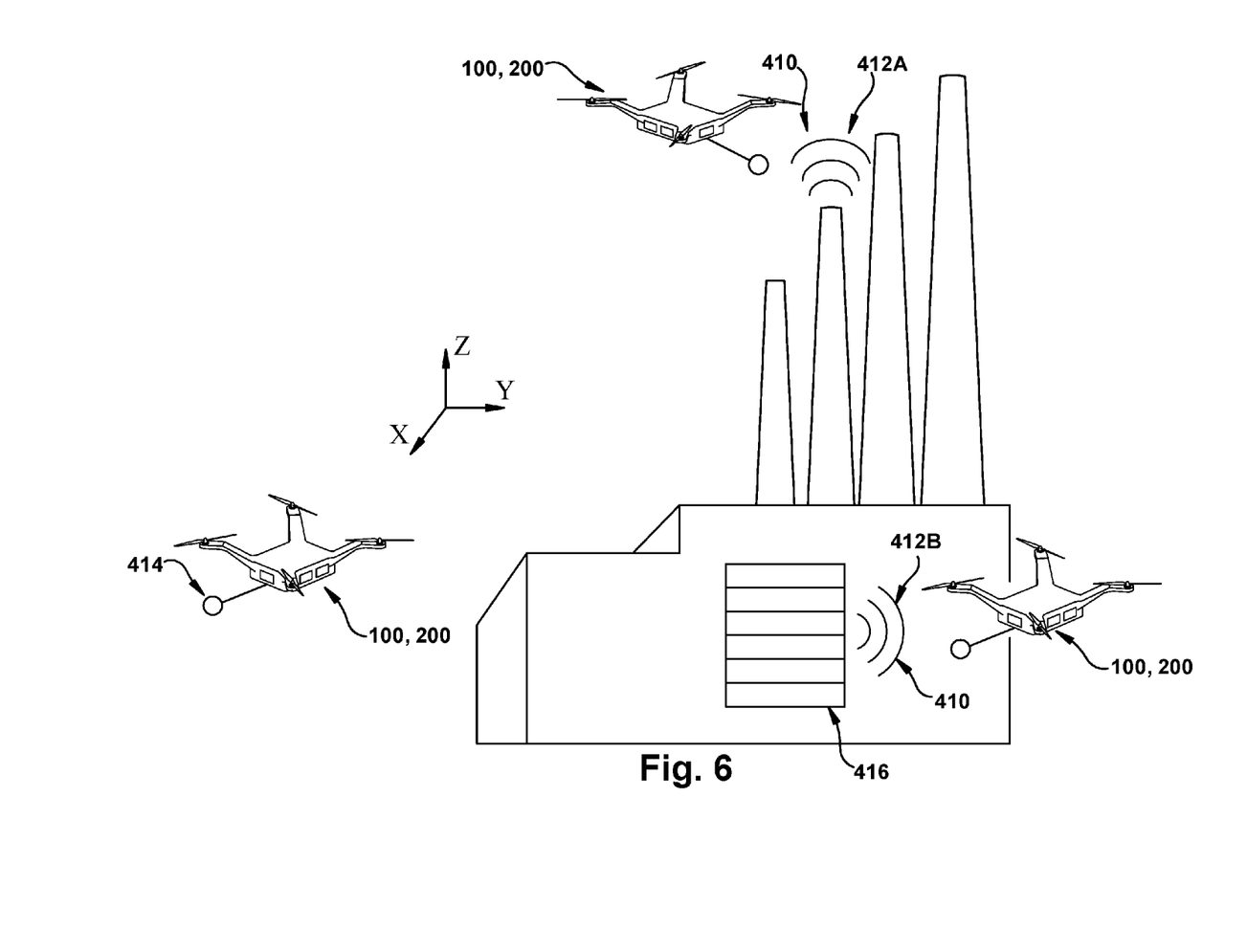

Referring to FIG. 6, in another embodiment, a specific location 410 (2 shown) for which acoustic data collection is desired may not be predetermined. Rather, flight control system 110, 210 may be configured to identify a specific location based on a location emanating a selected acoustic signature from the industrial machine. That is, flight control system 110, 210, using acoustic receiver 130, 230 and acoustic filter 136, 236, is configured to identify a specific location 410 relative to the industrial machine that is a source of a specific acoustic signature emanating from the industrial machine. In this case, specific location 410 is preliminarily unknown, but is discovered through acoustic data collection by acoustic receiver 130, 230 and controlled flight by flight control system 110, 210 to identify selected location 410.

The "selected acoustic signature" 412A, 412B can include any acoustic attribute, such as but not limited to: exceeding a user-selected acoustic amplitude and/or frequency, being within a user-selected range(s) of acoustic amplitude and/or frequency, etc. To illustrate, assume an industrial machine, such as the power plant shown in FIG. 6, may be known to operate at a known acoustic signature having a maximum amplitude and/or maximum frequency. A "selected acoustic signature" 412A could be set to, for example, identify a sound having an amplitude higher than the maximum amplitude and/or a frequency higher than the maximum frequency, which may indicate a repair at that location should be investigated. As indicated, a number of selected acoustic signatures 412A, 412B could be employed to identify a variety of situations. In any case, in this embodiment, flight control system 110, 210 flies UAV 102, 202 in a "search path" that would include moving in a number of directions (X, Y, Z) to identify in which direction(s) the collected acoustic data comports with the selected acoustic signature. For example, where the selected acoustic signature 412A includes sounds exceeding a maximum amplitude, from a selected starting position 414, flight control system 110, 210 selects the direction(s) in which collected acoustic data exhibits higher amplitude than the maximum amplitude. Where more than one unifiable direction is possible, flight control system 110, 210 may prioritize based on any number of factors, e.g., those directions closer to industrial machine, those directions closest to a selected part of the industrial machine, etc., to further test with additional acoustic data collection. The search path may include moving in a number of test directions, e.g., a set vertical Z distance, a set lateral Y direction and/or a set lateral X direction, to identify which direction(s) results in acoustic data collection that fits the selected acoustic signature. Those direction(s) that increase the matching with the selected acoustic signature, would be selected for UAV 102, 202 flight, and the process would repeat until no further increase in matching is indicated as possible, hence identifying specific location 410. For selected acoustic signature 412A, selected location 410 would be identified as at the top of the illustrated exhaust stack; and for selected acoustic signature 412B, selected position 410 would be adjacent the opening 416 illustrated in an outer wall of the power plant. As understood, once specific location 410 is identified, the source of the acoustic data matching the selected acoustic signature 412A, 412B can also be readily identified because UAV 102, 202 will be flying adjacent to the offending area of the industrial machine.

During the above process, flight control system 110, 210 would also simultaneously employ any now known or later developed collision avoidance procedures to override movement in any way that would cause damage to the particular collection system 100, 200, other collection systems 100, 200 flying adjacent thereto, the industrial machine and/or any person or other structure. In this regard, any of the above-described positioning technologies or any other now known or later developed collision avoidance systems, e.g., radar, could be employed.

It is emphasized that while the above description describes use of a single collection system 100, 200, multiple collections systems 100, 200, i.e., UAVs 102, 202, may be employed simultaneously or sequentially, each system controlled by its own flight control system 110, 210.

Each collection system 100, 200 can also be equipped with a variety of other common control and data acquisitions systems. For example, each collection system 100, 200 may also include at least one other non-destructive evaluation (NDE) device such as an acoustic transmitter, a radiation source, a radiation detector, an ultrasonic device, a radiographic device, a thermographic device, an electromagnetic device and/or any other suitable evaluation device as desired in the specific application. Additional NDE devices 260 (shown in FIG. 2 only for clarity) may also be distributed at various locations on the UAVs. UAVs 102, 202 can also carry other accessories like a light source to enhance image retrieval, a laser pointer to create a bright contrast spot on a part of the industrial machine so that the lens of camera 152, 252 can focus with this spot as a reference.

The present disclosure adapts existing UAV technology by employing an acoustic receiver and acoustic filter in an unconventional fashion. With appropriate acoustic receiver, camera, autonomous navigation, transmitting and/or recording, collection system 100, 200 allows for acoustic inspection of, e.g., large industrial machines such as a power plant, with acoustic data collection from key specific locations representing acoustic sources (such as inlet systems and exhaust ducts/stacks) which are typically located very high off the ground in very difficult to access locations. Flight control system 110, 210 can be programmed/directed to strategic specific locations which provide optimized data to capture and quantify acoustic emissions while the machine is in operation. The system has the capability to collect acoustic data based on a predetermined autonomous path, e.g., a systematic grid or array that meets industry or regulatory standards, or search for a specific location that is near a source of a select acoustic signature. Acoustic data acquired using this system and method provides optimized modeling and sound level predictions at other locations. Additionally, the acoustic data collected provides more useful information to optimize designs for improved attenuation. Collection system 100, 200 also provides for closer acoustic inspection for difficult or impossible to reach locations, compared to conventional ground-based or lift-based inspections. Collection system 100, 200 also provides the ability to reach areas that are not easily accessible quickly, reach more areas quickly, with less cost and with reduced risk to humans. The additional acoustic data collected offers improved measurement data, model information and predictions for noise levels in other locations as these data are often not available due to the difficulty/expense in obtaining.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specific. In at least some instances, the approximating language may correspond to the precision of an instrument for measuring the value. In one example, "approximately" indicates +/−10% of the value, or if a range, of the values stated. Throughout the specification and claims, range limitations may be combined and/or interchanged, such ranges are identified and include all the sub-ranges contained therein unless context or language indicates otherwise.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for collecting acoustic data from an industrial machine, comprising:
   providing an unmanned aerial vehicle (UAV) having a flight control system and an acoustic receiver attached thereto;
   using the flight control system to autonomously identify a specific location based on a location emanating a selected acoustic signature from the industrial machine,
   wherein the specific location includes a source of the selected acoustic signature; and
   positioning the unmanned aerial vehicle at the specific location so that the acoustic receiver collects acoustic data from the industrial machine at the specific location,
   wherein the acoustic data includes at least one of a frequency or an amplitude of a sound wave from the industrial machine, and collecting the acoustic data includes determining the at least one of the frequency or the amplitude.

2. The method of claim 1, further comprising providing the unmanned aerial vehicle with a camera, and using the camera to automatically identify the specific location.

3. The method of claim 2, further comprising manually using the flight control system to identify the specific location based on an image captured by the camera.

4. The method of claim 1, wherein the specific location includes a plurality of predetermined specific locations relative to the industrial machine.

5. The method of claim 1, further comprising filtering the acoustic data at the unmanned aerial vehicle to remove unwanted sound from the collected acoustic data.

6. The method of claim 1, wherein providing at least one unmanned aerial vehicle further comprises providing at least one of a helicopter and a blimp.

7. The method of claim 1, wherein the positioning the unmanned aerial vehicle further comprises navigating the unmanned aerial vehicle about an exterior of the industrial machine, wherein the navigating is performed substantially by a remote operator.

8. The method of claim 1, wherein the positioning the unmanned aerial vehicle further comprises navigating the unmanned aerial vehicle about an exterior of the industrial machine, wherein the navigating is performed substantially on a pre-programmed autonomous path.

9. The method of claim 1, wherein the providing the unmanned aerial vehicle further comprises:
   providing multiple unmanned aerial vehicles,
   wherein each of the multiple unmanned aerial vehicles is either remotely controlled by a human operator or controlled to navigate on a pre-programmed autonomous path.

10. The method of claim 1, further comprising:
    providing a global positioning system to determine a relative location of the unmanned aerial vehicle,
    wherein the global positioning system is used to at least one of: navigate the unmanned aerial vehicle and maintain position of the unmanned aerial vehicle during flight.

11. A system for collecting acoustic data from an industrial machine, the system comprising:
    an unmanned aerial vehicle (UAV) including a flight control system;
    an acoustic receiver attached to the unmanned aerial vehicle for collecting acoustic data from the industrial machine; and
    an acoustic filter attached to the acoustic receiver and the unmanned aerial vehicle for filtering unwanted sound from the acoustic data,
    wherein the unmanned aerial vehicle is positioned so that the acoustic receiver collects acoustic data from the industrial machine,
    wherein the acoustic data includes at least one of a frequency or an amplitude of a sound wave from the industrial machine, and collecting the acoustic data includes determining the at least one of the frequency or the amplitude,
    wherein the flight control system is configured to autonomously identify a specific location based on a location emanating a specific acoustic signature from the industrial machine, and
    wherein the specific location includes a source of the specific acoustic signature.

12. The system of claim 11, further comprising a boom member coupled to the unmanned aerial vehicle for positioning the acoustic receiver a distance from the unmanned aerial vehicle.

13. The system of claim 11, wherein the unmanned aerial vehicle includes a camera.

14. The system of claim 13, wherein the flight control system automatically identifies the specific location based on an image captured by the camera.

15. The system of claim 11, wherein the specific location includes a plurality of predetermined specific locations relative to the industrial machine.

16. The system of claim 11, wherein the flight control system navigates the unmanned aerial vehicle about an exterior of the industrial machine based substantially on a pre-programmed autonomous path.

17. The system of claim 11, wherein the unmanned aerial vehicle includes multiple unmanned aerial vehicles, wherein each of the multiple unmanned aerial vehicles is controlled by at least one of: a human operator and a pre-programmed autonomous path.

18. A system for collecting acoustic data from an industrial machine, the system comprising:
- an unmanned aerial vehicle (UAV) including a flight control system; and
- an acoustic receiver attached to the unmanned aerial vehicle for collecting acoustic data from the industrial machine,
- wherein the flight control system is configured to autonomously identify a specific location relative to the industrial machine that is a source of a specific acoustic signature emanating from the industrial machine.

* * * * *